United States Patent [19]
Tanabe et al.

[11] Patent Number: 5,307,197
[45] Date of Patent: Apr. 26, 1994

[54] OPTICAL CIRCUIT FOR A POLARIZATION DIVERSITY RECEIVER

[75] Inventors: Takashi Tanabe; Haruhito Shimizu, both of Tokyo, Japan

[73] Assignee: NEC Corporation, Tokyo, Japan

[21] Appl. No.: 935,977

[22] Filed: Aug. 27, 1992

[30] Foreign Application Priority Data

Aug. 27, 1991 [JP] Japan .................. 3-240632
Aug. 30, 1991 [JP] Japan .................. 3-245214

[51] Int. Cl.$^5$ ............................................. H04B 10/06
[52] U.S. Cl. ................................................... 359/192
[58] Field of Search ......................... 359/192; 356/349

[56] References Cited

U.S. PATENT DOCUMENTS 4,718,120 1/1988 Tzeng .................................. 359/192

FOREIGN PATENT DOCUMENTS

0251062 1/1988 European Pat. Off. ............ 359/192

Primary Examiner—Leslie Pascal
Attorney, Agent, or Firm—Sughrue, Mion, Zinn, Macpeak & Seas

[57] ABSTRACT

An optical circuit according to the present invention includes a first beam splitter for splitting a signal light to two polarization lights, first and second optical couplers for coupling the split signal lights and local lights in each, and second and third beam splitters for coupling corresponding polarization lights supplied from the first and second optical couplers. The second and third beam splitters supply output signals to one double-balanced receiver of a polarization diversity receiver.

10 Claims, 7 Drawing Sheets

OPTICAL CIRCUIT FOR A POLARIZATION DIVERSITY RECEIVER

FIELD OF THE INVENTION

This invention relates to an optical circuit, and more particularly to, an optical circuit used as a front-end in a coherent optical receiver.

BACKGROUND OF THE INVENTION

Recently, a coherent optical communication system has been expected as one of long distance and large capacitance communication systems, and has been developed rapidly. In such a coherent optical communication system, a CP (continuous phase) FSK heterodyne method has been used generally.

A conventional optical circuit used for a polarization diversity receiver includes a polarization beam splitter (PBS) for splitting an input signal light to provide two polarization lights, a first optical coupler for branching a local signal light to two signal lights, and second and third optical couplers for coupling one of output signals of the PBS and one of output signals of the first optical coupler, respectively.

Output signals of the second and third optical couplers are supplied to two optical double-balanced receivers, and the optical signals are converted to electric signals thereby, respectively.

According to the conventional optical circuit, however, there is a disadvantage in that two heterodyne receiver including the two optical double-balanced receivers are required in the optical receiver. Therefore, the optical receiver in which the conventional optical circuit is used as a front-end is difficult to be simplified in structure.

SUMMARY OF THE INVENTION

Accordingly, it is an object of the invention to provide an optical circuit which is able to contribute to simplify a structure of an optical receiver.

According to the invention, an optical circuit for a polarization diversity receiver, includes:

a first beam splitter for splitting a signal light received at an input port to two polarization lights;

first and second optical couplers for coupling output signal lights of the first beam splitter and local lights, respectively; and second and third beam splitters for coupling corresponding polarization lights supplied from the first and second optical couplers, respectively.

The other objects and features of this invention will become understood from the following description with reference to the accompanying drawings.

DESCRIPTION OF THE PREFERRED EMBODIMENTS

For better understanding the background of the present invention, the basic principle of the conventional technology is first described hereinafter with reference to FIGS. 1 and 2.

Figure 1:
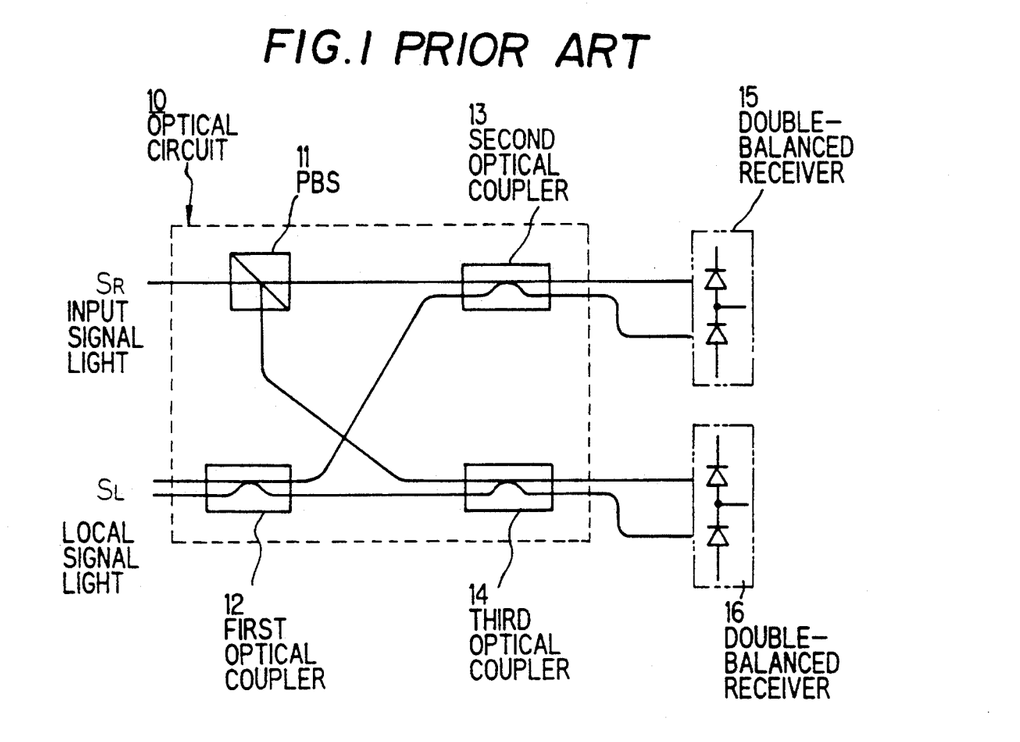
FIG. 1 is a schematic illustration showing a conventional optical circuit.

FIG. 1 shows a conventional optical circuit 10 used for a polarization diversity receiver. The optical circuit 10 includes a polarization beam splitter (PBS) 11 for splitting an input signal light $S_R$ to provide two polarization lights orthogonal to each other in polarization plane, a first optical coupler 12 for branching a local signal light $S_L$ to two signal lights, and second and third optical couplers 13 and 14 for coupling one of output signals of the PBS 11 and one of output signals of first optical coupler 12, respectively. Output signals of the second and third optical couplers 13 and 14 are supplied to optical double-balanced receivers 15 and 16, and the optical signals are converted to electric signals, respectively.

Figure 2:
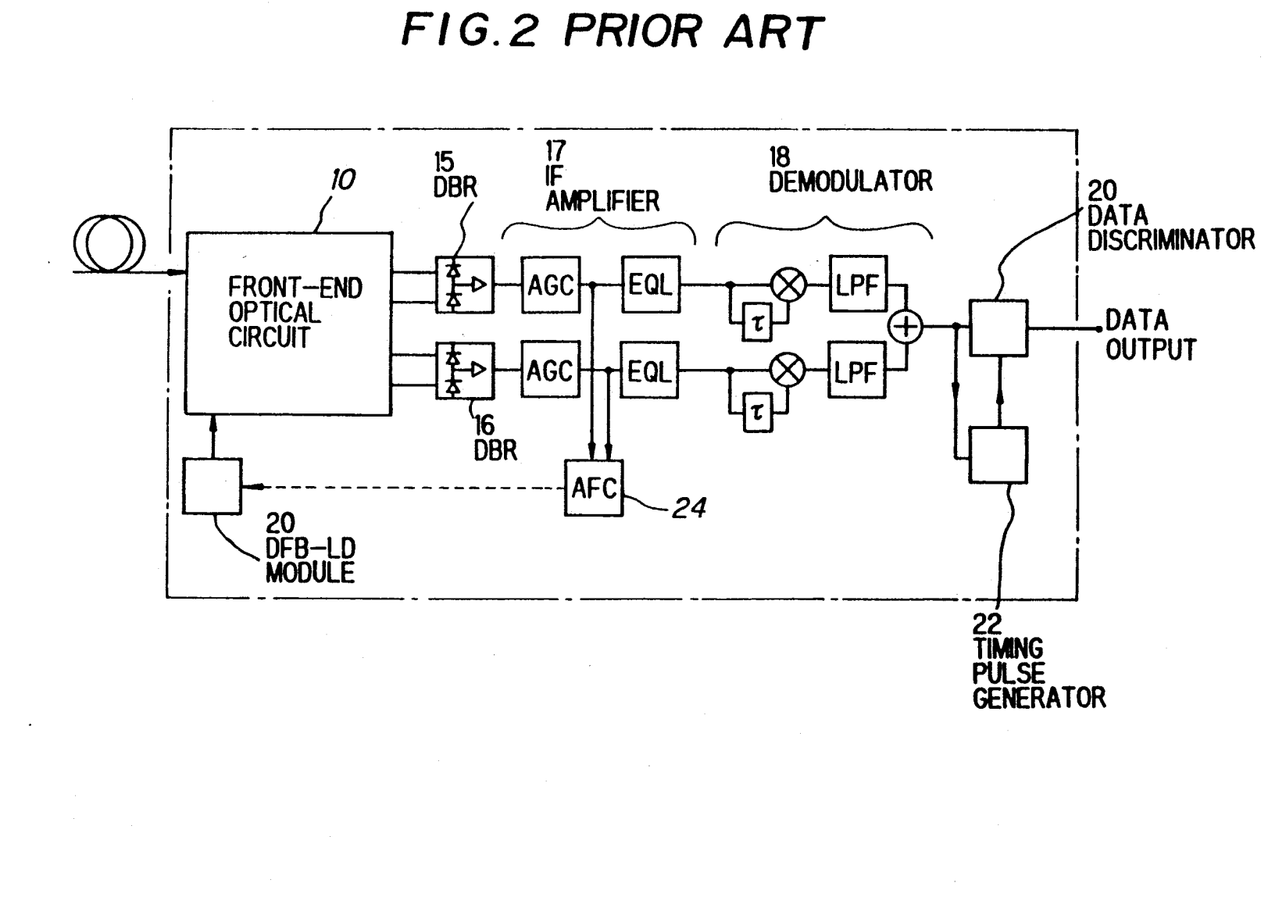
FIG. 2 is a block diagram showing a conventional polarization diversity receiver.

FIG. 2 shows a conventional polarization diversity receiver which uses the optical circuit 10 as a front-end. The diversity receiver is for an optical communication of a CPFSK heterodyne delayed detection type. The polarization diversity receiver includes the front-end optical circuit 10, two of double balanced receivers (DBR) 15 and 16, two systems of IF (intermediate frequency) amplifiers 17 each composed of an AGC (automatic gain control) circuit and an EQL circuit, two systems of demodulators 18 each composed of a delayed detection circuit and an LPF (low-pass filter), a timing pulse generator 22, an AFC (automatic frequency control) circuit 24, and a DFB-LD module 26 for generating local signal light.

Detailed description of the polarization diversity receiver is shown in "Polarization Independent Coherent Optical Receiver", by B. Grance, in "Journal of Light Wave Technology, vol. LT-5, No. 2, February 1987", and pages 39 to 44 in the report by "the electronics communication society, March 1990".

According to the conventional optical circuit 10, there is a disadvantage in that the two double-balanced receivers 15 and 16 and two systems of the IF amplifiers 17 and the demodulators 18 are required. Therefore, the optical receiver in which the conventional optical circuit 10 is used as a front-end optical circuit is difficult to be simplified in structure.

Figure 3:
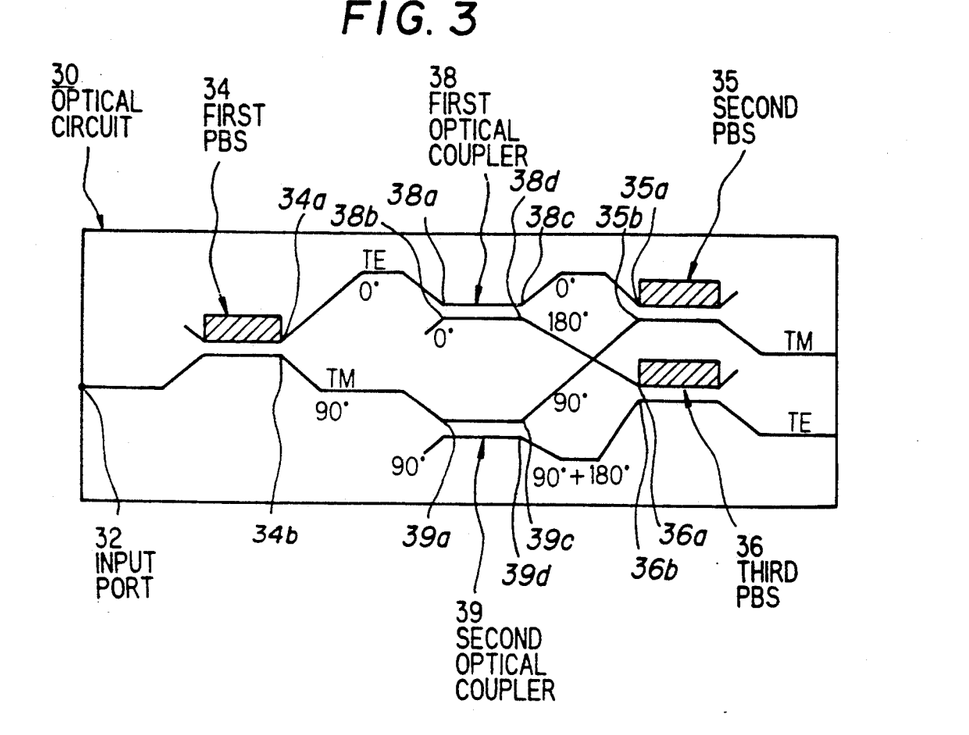
FIG. 3 is a schematic illustration showing an optical circuit of a first preferred embodiment according to the invention.

FIG. 3 shows a wave-guide type optical circuit 30 of a first preferred embodiment according to the invention. The optical circuit 30 includes an input port 32 for an input signal light, first to third polarization beam splitters (PBS) 34 to 36 for splitting or coupling light, and first and second optical couplers 38 and 39 for coupling or branching light.

The above mentioned optical devices 32, 34 to 36, 38 and 39 are connected by wave-guides fabricated on a substrate as follows. That is, a first output port 34a of the first PBS 34 is connected to a first input port 38a of the first optical coupler 38, and a second output port 34b of the first PBS 34 to a first input port 39a of the second optical coupler 39. A first output port 38c of the first optical coupler 38 is connected to a first input port 35a of the second PBS 35, and a second output port 38d of the first optical coupler 38 is connected to a first input port 36a of the third PBS 36. And, a first output port 39c of the second optical coupler 39 is connected to a second input port of the second PBS 35, and a second output port 39d of the second optical coupler 39 is connected to a second input port 36b of the third PBS 36.

In the optical circuit 30, an optical length from a branch point of the first PBS 34 to a coupling point of the second PBS 35 via the first optical coupler 38, that from the branch point of the first PBS 34 to the coupling point of the second PBS 35 via the second optical coupler 39, that from the branch point of the first PBS 34 to a coupling point of the third PBS 36 via the first optical coupler 38, and that from the branch point of the first PBS 34 to the coupling point of the third PBS 36 via the second optical coupler 39 are arranged to be equal one another.

Figure 4:
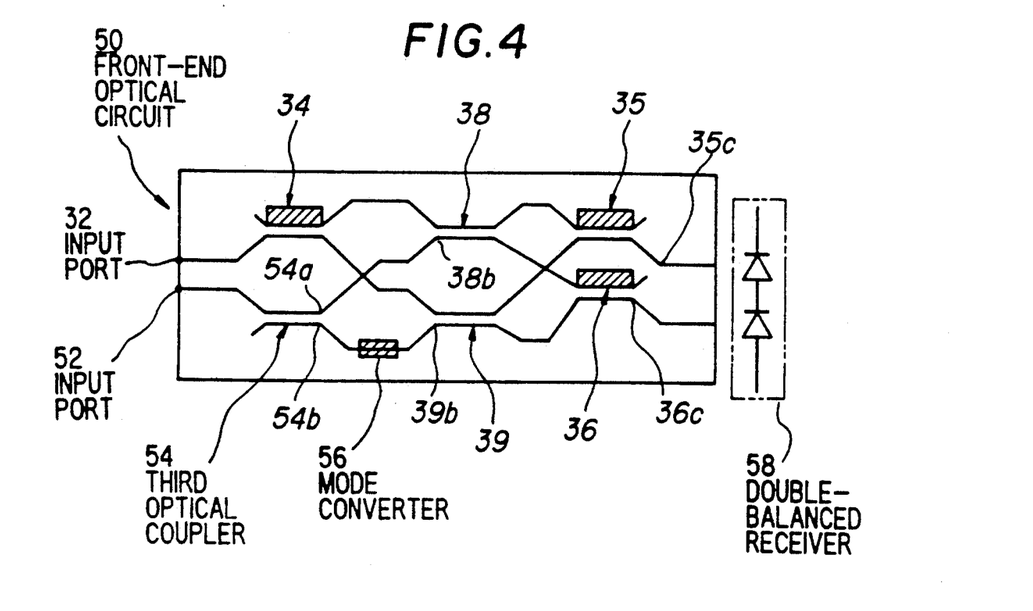
FIG. 4 is a schematic illustration showing a front-end optical circuit using the first preferred embodiment.

FIG. 4 shows a front-end optical circuit 50 using the optical circuit 30 for a coherent optical communication receiver. The front-end optical circuit 50 includes, in addition to the first to third PBS 34 to 36 and the first and second optical couplers 38 and 39 of the optical circuit 30 shown in FIG. 3, an input port 52 for a local signal light positioned by the input port 32, a third optical coupler 54 for branching a local signal light supplied from the input port 52, and a mode converter 56 for converting a propagation mode of light TE to TM.

In the front-end optical circuit 50, a second input port 38b of the first optical coupler 38 is connected to a first output port 54a of the third optical coupler 54, and a second input port 39b of the second optical coupler 39 is connected to a second output port 54b of the third optical coupler 54 through the mode converter 56. The second and third PBSs 35 and 36 are connected at output ports 35c and 36c to a double-balanced receiver (dual-PIN PD) 58. An optical length from the second PBS 35 to a light acceptance face of the double-balanced receiver 58 is arranged to be equal to that from the third PBS 36 to the light acceptance face of the double-balanced receiver 58.

The PBSs 34 to 36, the optical couplers 38, 39 and 54 and wave-guide for connecting them are made of LiNbO, substrate on which Ti is selectively diffused.

In fabrication of the wave-guide, Ti having a width of 6 μm and a thickness of 800 Å is formed on a LiNbO$_3$ substrate by photolithography technology, and Ti is diffused in the substrate by heating the substrate by 1050° C. for eight hours. Thus, a wave-guide of single mode is fabricated.

The optical couplers 38, 39 and 54 are of a directional coupling type. And, the PBSs 34 to 36 are of a directional coupler type in which metal is loaded on a waveguide of one side of coupling portions. The second and third PBSs 35 and 36 may be of a PBS identical to the first PBS 34 which is, however, arranged to be reverse in input and output on the substrate, so that the PBSs 35 and 36 are used as polarization couplers.

The mode converter 56 is fabricated by forming combshaped electrode on a wave-guide, and is used for converting a propagation mode of light. Detailed description of the mode converter 56 is shown on page 315 in "Optical Integrated Circuit" (by Ohomu Sha, Apr. 20, 1997), "Electro-optic waveguide TE-Tm mode converter with low drive voltage" (November 1980/vol. 5, No. 11/OPTICS LETTERS), and on page 3 in the report OQE86-146 entitled "An Approach to Optical Integration of the Two-Frequency Polarization Interferometer" by Kiminori Mizuuchi, Hiroyuki Toda, Masamitsu Haruna and Hiroshi Nishihara, Department of Electronics, Faculty of Engineering, Osaka University.

Figure 5:
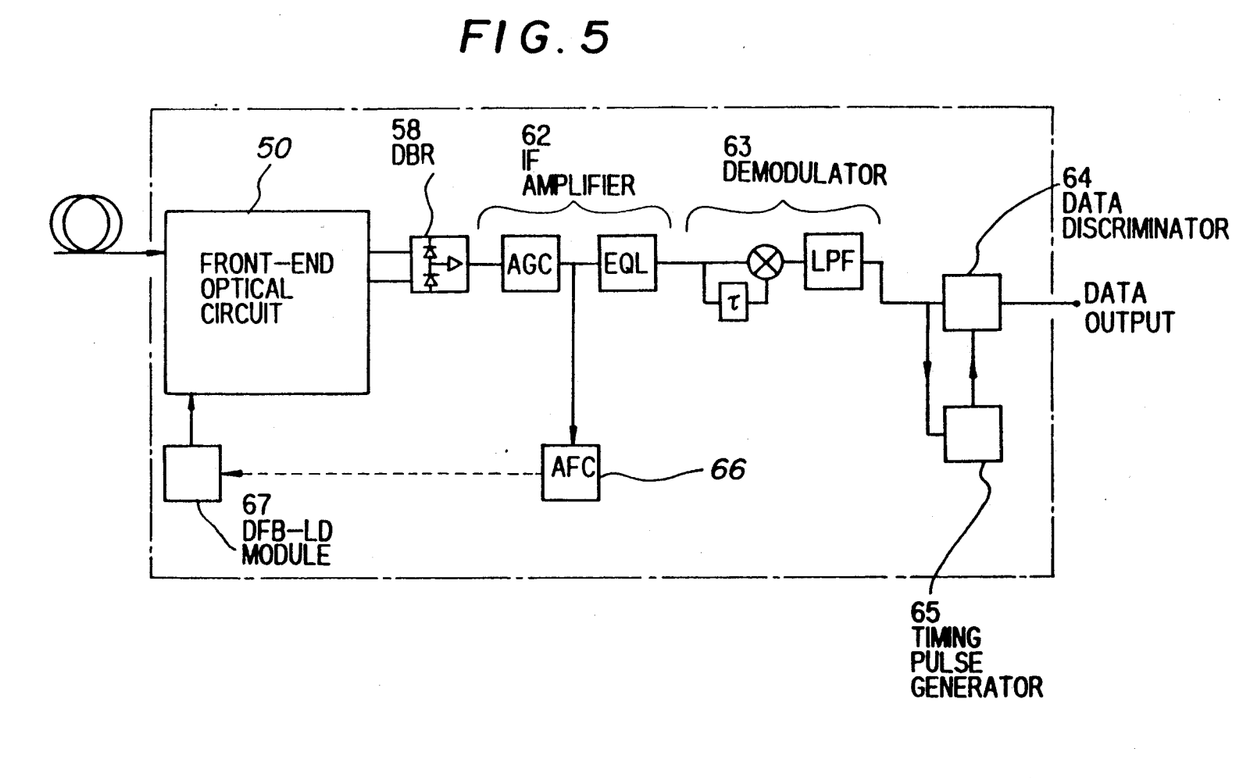
FIG. 5 is a block diagram showing a polarization diversity receiver using the front-end optical circuit shown in FIG. 4.

FIG. 5 shows a polarization diversity receiver for an optical communication of a CPFSK heterodyne delayed detection type, using the front-end optical circuit 50. The polarization diversity receiver includes the front-end optical circuit 50, a double balanced receiver (DBR) 58 composed of a twin-pin photo diode and a low noise amplifier, an IF (intermediate frequency) amplifier 62 composed of an AGC (automatic gain control) circuit and an EQL circuit for amplifying an IF signal, a demodulator 63 composed of a delayed detection circuit and an LPF (low-pass filter), a data discriminator 64, a timing pulse generator 65, an AFC (automatic frequency control) circuit 66 for maintaining frequency difference between signal light and local light constant, and a DFB-LD module 67 for generating local signal light.

The IF amplifier 62 controls a supplied signal to have an IF frequency of 5 GHz and a bandwidth of 5 GHz. The AGC supplies an output signal having a phase difference corresponding to "1" and "0" of the signal input light, and the output signal becomes a baseband signal of "1" and "0" to be demodulated by the demodulator 63 using a delayed detection method.

The AFC circuit 66 controls the DFB-LD module 67 in accordance with an output signal of the AGC circuit of the IF amplifier 62 so that output wavelength of the local signal light $S_L$ is maintained constant. In more detail, when a signal light having an intermediate frequency which is shifted from 5 GHz due to changing of wavelength thereof is supplied to the DBR 58, that is, when an amplitude of a 5 GHz in an output signal of the AGC changes from a standard value, the LD (laser diode) in the DFB-LD module 67 is controlled by the AFC circuit 66 to have an amplitude which is equal to a standard value. Actually, the AFC circuit 66 controls amount of current flowing through a peltier element (not shown) arranged in the DFB-LD module 67 for cooling the LD, in accordance with an amplitude difference between the output signal of the AGC and the standard value, so that heat radiation and heat absorption of the LD are controlled suitably. Thus, a wavelength of the local light supplied from the LD is maintained constant.

Figure 6:
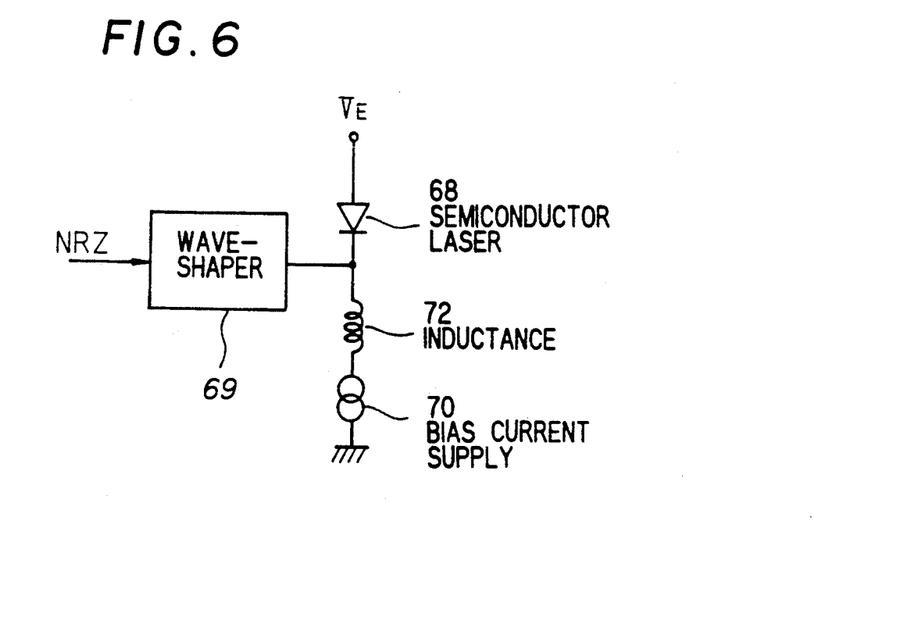
FIG. 6 is a schematic illustration showing a transmitter used for the polarization diversity receiver shown in FIG. 5.

FIG. 6 shows a transmitter for transmitting the input signal light $S_R$ to the front-end optical circuit 50 of the polarization diversity receiver shown in FIG. 5. The transmitter includes a wave-shaper 69, a semiconductor laser diode 68, a bias current supply 70 and an inductance connected between the semiconductor laser diode 68 and the bias current supply 70.

Figure 7:
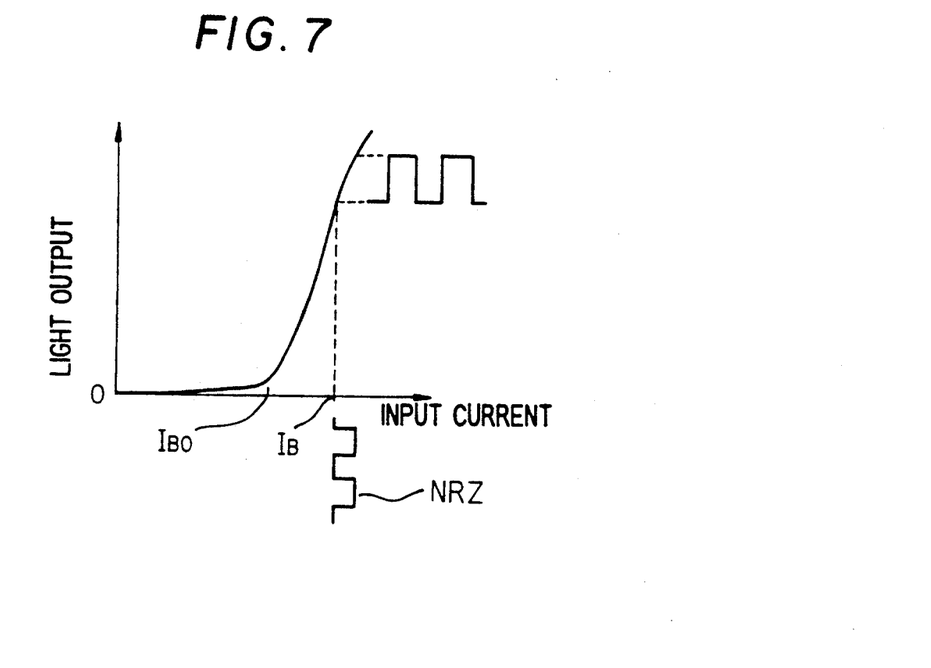
FIG. 7 is a graph showing operation of the transmitter shown in FIG. 6.

The wave-shaper 69 is supplied with an NRZ (nonreturn zero) signal, and supplies a square wave signal to the semiconductor laser 68. The semiconductor laser 68 has the characteristic as shown in FIG. 7 between input current and light output. That is, in case that bias current $I_{30}$ which is close to a threshold level of the semiconductor laser 68 is supplied from the bias current supply 70 to the semiconductor laser 68 through the inductance 72 and the NRZ signal of 1.5 Mb/s is supplied from the wave-shaper 69 to the semiconductor laser 68, the semiconductor laser 68 supplies a light signal of single wavelength of $$3\times10^3/1.5\times10^{-5}=2\times10^{14} \text{ Hz}.$$

Figure 8:
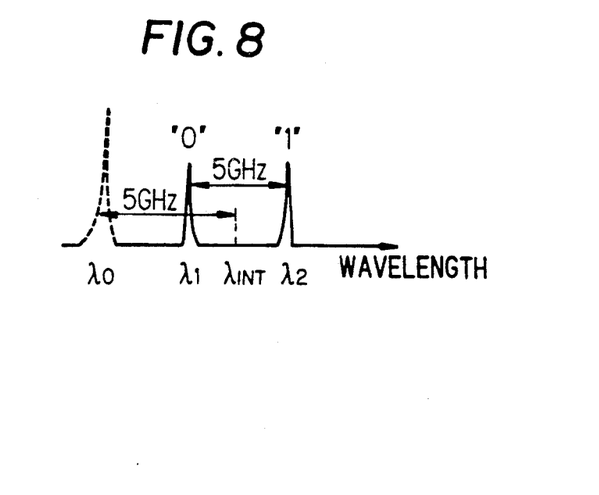
FIG. 8 is a graph showing operation of the first preferred embodiment.

On the other hand, in case that bias current $I_3$ which is much higher than the threshold level of the semiconductor laser 68 is supplied thereto and the high frequency NRZ signal is supplied from the wave-shaper 69 to the semiconductor laser 68, two light of frequency $\lambda_1$ and $\lambda_2$ ($\lambda_1<\lambda_2$) are generated by the semiconductor laser 68 in accordance with codes "1" and "0" of the NRZ signal as shown in FIG. 8. Thus, an FSK modulation is carried out. In this case, an intermediate wavelength between $\lambda_1$ and $\lambda_2$ is $1.2\times10^{14}$ Hz, and a frequency difference of the light signal which changes depending on a bandwidth thereof is 5 GHz when the NRZ signal is "0" or "1". The semiconductor laser 68 is thermally controlled to supply an output light having a wavelength which is maintained constant with the passage of time.

The DFB-LD module 67 is controlled to supply the local signal light $S_L$ having a frequency which is determined to be a reasonable value to provide the IF signal of 5 GHz. That is, the DFB-LD module 67 supplies the local signal light $S_L$ having a wavelength of $\lambda_0$ which has a frequency difference of 5 GHz from the intermediate frequency $\lambda_{IN\,T}$ of frequency $\lambda_1$ and $\lambda_2$ as shown in FIG. 8.

Next, operation of the first preferred embodiment will be explained. When a input signal light $S_R$ is supplied from the transmitter shown in FIG. 6 to the input port 32 of the front-end optical circuit 50, the input signal is split into TE mode and TM mode by the first PBS 34, and the split signals are supplied to the first and second optical couplers 38 and 39. On the other hand, when a local signal light $S_L$ of TE mode is supplied to the input port 52 the local signal light $S_L$ is branched by the third optical coupler 54, and one is directly supplied to the first optical coupler 38 and the other is supplied to the second optical coupler 39 through the mode converter 56 to be converted into TM mode.

In the second and third optical couplers 38 and 39, the input signal light $S_R$ and the local signal light $S_1$ are coupled in each mode, so that beat light signals having a frequency corresponding to a frequency difference (2.5 to 7.5 GHz) between the input signal light $S_R$ and the local signal light $S_1$ are generated. Each one of output signals of the first and second optical couplers 38 and 39 is supplied to the second PBS 35 and the other is supplied to the third PBS 36, respectively, and the signals are coupled in each mode by the second and third PBS 35 and 36. Output signals of the second and third PBSs 35 and 36 are supplied to the photodiode of the double-balanced receiver 58, respectively.

In the optical double-balanced receiver 58, input signals are converted into electric signals by the photodiode. At this time, a square-law detection is substantially carried out in the photodiode, so that a frequency difference and a phase difference between the input signal light $S_R$ and the local signal light $S_1$ are obtained as output signals of the photodiode. The output signal of the double-balanced receiver 58 is supplied to the following stage as a data output through the IF amplifier 62, the demodulator 63 and the data discriminator 64.

As described above, according to the first preferred embodiment, a polarization diversity receiver for coherent communication can be fabricated by using one system of heterodyne receiver including one balanced-receiver, so that the coherent receiver becomes simple in structure.

Figure 9:
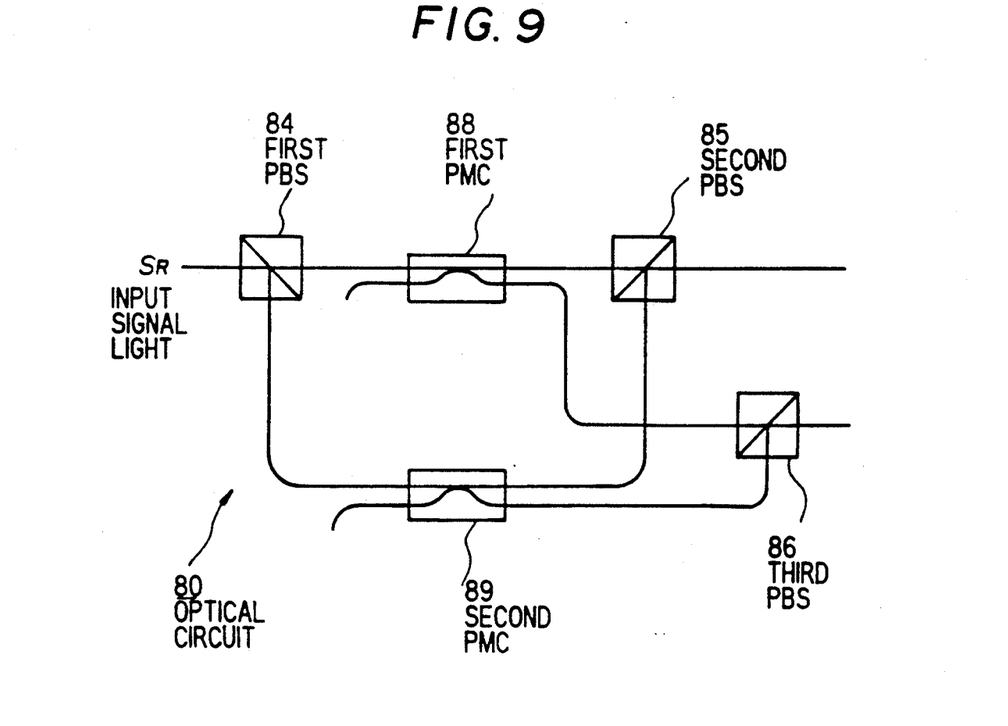
FIG. 9 is a schematic illustration showing an optical circuit of a second preferred embodiment according to the invention.

FIG. 9 shows an optical circuit 80 of a second preferred embodiment according to the invention. This embodiment has lot elements in common with the first preferred embodiment, so that, hereinafter, structure only about the different elements will be explained. In the optical circuit 80, polarization maintaining optical fibers are used instead of the wave-guide of the first preferred embodiment, and first to third polarization beam splitters (PBS) 84 to 86 and first and second optical couplers (PMC) 88 and 89 are adopted to the polarization maintaining optical fibers, respectively. The polarization maintaining optical fibers are connected on the same polarization principal axis each other by using optical splices or the like.

Figure 10:
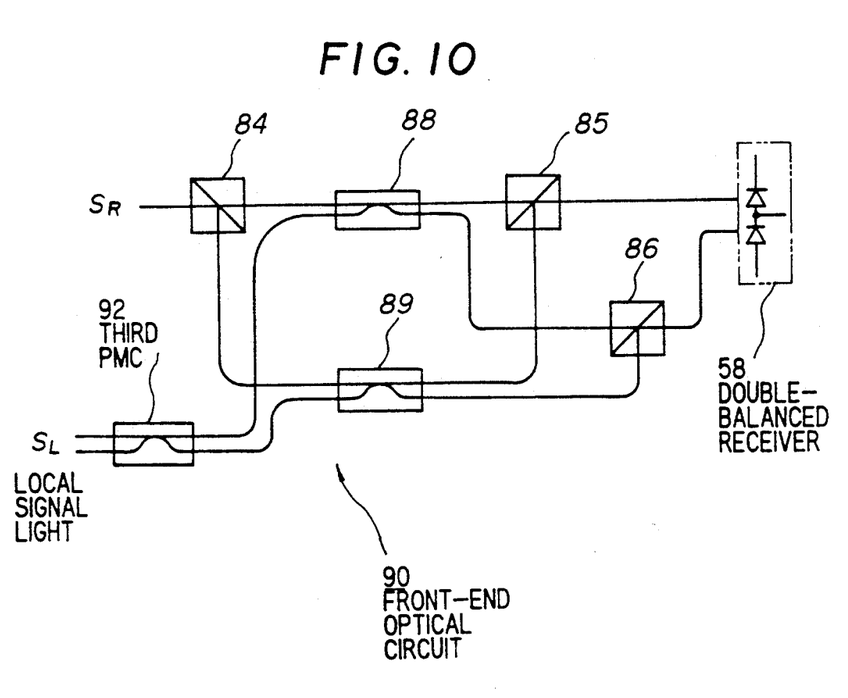
FIG. 10 is a schematic illustration showing a front-end optical circuit using the second preferred embodiment.

FIG. 10 shows a front-end optical circuit 90 using the optical circuit 80 shown in FIG. 9. The front-end optical circuit 90 is also used as a front-end in the polarization diversity receiver shown in FIG. 5. The front-end optical circuit 90 includes a third optical coupler 92 for branching a local signal light, and supplying the branched signal lights to the first and second optical couplers 88 and 89. The front-end optical circuit 90 is not provided with a mode converter such as in the circuit 50 of the first preferred embodiment.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

That is, an optical coupler of Y-branch structure may be used instead of an optical coupler of optical directional type. A beam splitter of Y-branch structure with two output wave-guide having different width may be used instead of a beam splitter which is fabricated by forming a combshaped electrode on the wave-guide. A mode converter having electrodes on the wave-guide and the both side thereof may be used instead of a mode converter which is fabricated by forming a combshaped electrode on the wave-guide. A semiconductor substrate of GaAs like that may be used as a substrate instead of a substrate of LiNbO$_3$.

What is claimed is:

1. An optical circuit for a polarization diversity receiver, comprising:
    a first beam splitter for splitting an input signal light received at a signal input port into two polarization lights having polarization planes orthogonol to each other;
    first and second optical couplers for respectively coupling output signal lights of said first beam splitter and two local signal lights having predetermined wavelength differences from said input signal light, and
    second and third beam splitters for coupling respective first output signal lights of said first and second optical couplers, and respective second output signal lights thereof to generate first and second intermediate frequency signal lights.

2. An optical circuit, according to claim 1, further comprising:
an input port for said local signal lights positioned on the same side of the optical circuit as said signal input port; and
a third optical coupler for branching local signal light supplied to said local signal light input port wherein output signals of said third optical coupler are supplied to said first and second optical couplers.

3. An optical circuit, according to claim 2, wherein: said first to third beam splitters and said first to third optical couplers are connected by polarization maintaining fibers to each other.

4. An optical circuit, according to claim 2, wherein: said first to third beam splitters and said first to third optical couplers are connected by optical wave-guides to each other.

5. An optical circuit, according to claim 4, further comprising:
a mode converter which is positioned between said second and third optical couplers for converting a propagation mode of said local signal light.

6. An optical circuit, according to claim 1, wherein: said second and third beam splitters have the same structure as said first beam splitter, and are used as polarization couplers by having their input and output positioned in the opposite direction as the input and output of said first beam splitters.

7. An optical circuit, according to claim 1, wherein: said first to third beam splitters and said first and second optical couplers are connected by polarization maintaining fibers to each other.

8. An optical circuit, according to claim 1, wherein: said first to third beam splitters and said first and second optical couplers are connected by optical wave-guides to each other.

9. An optical circuit, according to claim 6, further comprising:
a mode converter which is positioned between said second and third optical couplers for converting a propagation mode of said local signal light.

10. An optical circuit, comprising:
a first beam splitter for splitting a signal light received at an input port to first and second signal lights having polarization planes orthogonol to each other;
a first optical coupler for coupling said first signal light and a first local signal light to generate first and second coupled signal lights;
a second optical coupler for coupling said second signal light and a second local signal light to generate third and fourth coupled signal lights;
a second beam splitter for coupling said first and third coupled signal lights to generate a first intermediate frequency signal light;
a third beam splitter for coupling said second coupled signal light and said fourth coupled signal light to generate a second intermediate frequency signal light, said first and second intermediate frequency signal lights having polarization planes orthogonol to each other.

* * * * *

UNITED STATES PATENT AND TRADEMARK OFFICE
CERTIFICATE OF CORRECTION

PATENT NO. : 5,307,197
DATED : April 26, 1994
INVENTOR(S) : TANABE et al.

It is certified that error appears in the above-identified patent and that said Letters Patent is hereby corrected as shown below:

Column 3, line 52, change "LiNbO", insert --$LiNbO_3$--.

Column 4, line 68, change "$I_{30}$" to --$I_{80}$--.

Column 5, line 8, change "$3 \times 10^3/1.5 \times 10^{-5}$" to

--$3 \times 10^8/1.5 \times 10^{-6}$--;

line 10, change "$I_3$" to --$I_B$--.

Signed and Sealed this

Thirteenth Day of September, 1994

Attest:

BRUCE LEHMAN

*Attesting Officer*  *Commissioner of Patents and Trademarks*